(12) United States Patent
Kirschbaum et al.

(10) Patent No.: US 12,722,686 B2
(45) Date of Patent: Sep. 1, 2026

(54) METHOD AND DETECTION UNIT FOR DETECTING A PROBABILITY THAT A STEERING ELEMENT OF A VEHICLE IS HELD BY A HAND OF A DRIVER

(71) Applicant: KNORR-BREMSE Systeme fuer Nutzfahrzeuge GmbH, Munich (DE)

(72) Inventors: Sven Kirschbaum, Mettmann (DE); Jens-Hauke Mueller, Velbert-Neviges (DE); Ali Karbaschian, Ratingen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 95 days.

(21) Appl. No.: 18/570,921

(22) PCT Filed: Jun. 8, 2022

(86) PCT No.: PCT/EP2022/065516
§ 371 (c)(1),
(2) Date: Dec. 15, 2023

(87) PCT Pub. No.: WO2022/263249
PCT Pub. Date: Dec. 22, 2022

(65) Prior Publication Data

US 2024/0217579 A1 Jul. 4, 2024

(30) Foreign Application Priority Data

Jun. 18, 2021 (DE) ..................... 10 2021 003 148.2

(51) Int. Cl.
*B62D 1/28* (2006.01)
*B62D 6/10* (2006.01)
*B62D 15/02* (2006.01)

(52) U.S. Cl.
CPC .............. *B62D 1/286* (2013.01); *B62D 6/10* (2013.01); *B62D 15/025* (2013.01)

(58) Field of Classification Search
None
See application file for complete search history.

(56) References Cited

U.S. PATENT DOCUMENTS 8,190,329 B2 * 5/2012 Kawakami ............ B60W 40/09 340/576
8,548,667 B2 * 10/2013 Kaufmann ............ B60W 40/08 701/23

(Continued)

FOREIGN PATENT DOCUMENTS

CN 103158699 A * 6/2013 ............... B62D 6/00
CN 104029683 A * 9/2014 ........... B62D 5/0481

(Continued)

OTHER PUBLICATIONS

International Search Report (PCT/ISA/210) issued in PCT Application No. PCT/EP2022/065516 dated Sep. 22, 2022 with English translation (4 pages).

(Continued)

*Primary Examiner* — Kevin R Steckbauer
(74) *Attorney, Agent, or Firm* — Crowell & Moring LLP

(57) ABSTRACT

A method for detecting a probability of a steering element of a vehicle being held by a hand of a driver is disclosed. The method includes a step of reading in a torque signal representing a torque acting on a torque sensor coupled between the steering element and a steering transmission. The method also includes a step of recognizing a probability of a steering element of a vehicle being held by a hand of a driver if a value of the torque signal and/or an absolute value of the torque signal exceed(s) a threshold value that is dependent on a current vehicle speed in order to detect the probability of the steering element of the vehicle being held by a hand of the driver.

15 Claims, 4 Drawing Sheets

(56) References Cited

U.S. PATENT DOCUMENTS

| | | | | |
|---|---|---|---|---|
| 8,880,287 | B2 * | 11/2014 | Lee | B62D 5/0481 701/34.4 |
| 9,840,275 | B2 * | 12/2017 | Trimboli | B60W 40/09 |
| 9,868,464 | B2 * | 1/2018 | Lee | B62D 15/021 |
| 10,029,676 | B2 * | 7/2018 | Kaufmann | B60W 30/00 |
| 10,160,484 | B2 * | 12/2018 | Lee | B62D 6/00 |
| 10,988,173 | B2 * | 4/2021 | Goering | B62D 5/0457 |
| 11,091,148 | B2 * | 8/2021 | Kaufmann | B60W 30/00 |
| 12,304,499 | B2 * | 5/2025 | Herman | G06V 40/18 |
| 2008/0262676 | A1 * | 10/2008 | Kawakami | B62D 15/029 701/41 |
| 2013/0158771 | A1 * | 6/2013 | Kaufmann | B60W 40/08 701/1 |
| 2014/0257628 | A1 * | 9/2014 | Lee | B62D 15/025 701/34.4 |
| 2015/0025745 | A1 * | 1/2015 | Tamura | B62D 6/00 701/41 |
| 2015/0210273 | A1 * | 7/2015 | Kaufmann | B62D 1/286 701/1 |
| 2016/0167707 | A1 * | 6/2016 | Lee | B62D 15/029 701/41 |
| 2017/0029021 | A1 * | 2/2017 | Lee | B62D 15/025 |
| 2017/0101128 | A1 * | 4/2017 | Kirschbaum | B62D 6/00 |
| 2017/0183032 | A1 | 6/2017 | Wilhelm et al. | |
| 2017/0297618 | A1 | 10/2017 | Shah et al. | |
| 2022/0161846 | A1 | 5/2022 | Ghanbari et al. | |
| 2022/0227419 | A1 * | 7/2022 | Farooqi | G07C 5/02 |
| 2022/0402499 | A1 * | 12/2022 | Carroll | B60W 60/001 |
| 2024/0078819 | A1 * | 3/2024 | Herman | G06V 20/59 |
| 2024/0217579 | A1 * | 7/2024 | Kirschbaum | B62D 1/286 |
| 2024/0375664 | A1 * | 11/2024 | Herman | B60W 40/08 |

FOREIGN PATENT DOCUMENTS

| | | | | | |
|---|---|---|---|---|---|
| CN | 103158699 | B | * | 3/2016 | B62D 6/00 |
| CN | 106394676 | A | * | 2/2017 | B62D 15/022 |
| CN | 104029683 | B | * | 3/2018 | B62D 5/0481 |
| CN | 106394676 | B | * | 1/2020 | B62D 15/02 |
| CN | 111055846 | A | * | 4/2020 | B62D 5/04 |
| CN | 113200046 | A | * | 8/2021 | B60W 40/09 |
| CN | 111055846 | B | * | 9/2021 | B62D 5/04 |
| CN | 113200046 | B | * | 12/2023 | B60W 40/09 |
| CN | 117429444 | A | * | 1/2024 | B60W 40/09 |
| CN | 117500713 | A | * | 2/2024 | B62D 15/025 |
| CN | 118770238 | A | * | 10/2024 | B60W 40/09 |
| DE | 10 2009 028 647 | A1 | | 2/2011 | |
| DE | 102011002401 | A1 | * | 7/2012 | B60W 40/08 |
| DE | 10 2011 109 711 | A1 | | 2/2013 | |
| DE | 102013113628 | A1 | * | 9/2014 | B60W 40/09 |
| DE | 102013211166 | B3 | * | 12/2014 | B60W 40/09 |
| DE | 102016114161 | A1 | * | 2/2017 | B62D 6/00 |
| DE | 102013113628 | B4 | * | 12/2017 | B62D 5/0481 |
| DE | 102016216590 | A1 | * | 3/2018 | B60W 50/0098 |
| DE | 102016114161 | B4 | * | 8/2022 | B62D 15/025 |
| DE | 102021003148 | A1 | * | 12/2022 | B62D 15/025 |
| DE | 102022206105 | A1 | * | 12/2023 | B62D 5/0481 |
| EP | 2604487 | A1 | * | 6/2013 | B62D 6/00 |
| EP | 2604487 | B1 | * | 12/2017 | B62D 6/00 |
| JP | H1178936 | A | * | 3/1999 | B62D 15/0285 |
| JP | 2008221967 | A | * | 9/2008 | B60W 40/09 |
| JP | 5073323 | B2 | * | 11/2012 | B62D 15/025 |
| JP | 2017-114324 | A | | 6/2017 | |
| JP | 2018-1907 | A | | 1/2018 | |
| JP | 2018-52379 | A | | 4/2018 | |
| JP | 2020-6806 | A | | 1/2020 | |
| JP | 2024523375 | A | * | 6/2024 | B62D 15/025 |
| JP | 7639186 | B2 | * | 3/2025 | B62D 15/025 |
| KR | 20240001237 | A | * | 1/2024 | B62D 15/025 |
| WO | WO-2022263249 | A1 | * | 12/2022 | B62D 15/025 |

OTHER PUBLICATIONS

German-language Written Opinion (PCT/ISA/237) issued in PCT Application No. PCT/EP2022/065516 dated Sep. 22, 2022 with English translation (9 pages).

German-language Office Action issued in German Application No. 10 2021 003 148.2 dated Nov. 29, 2021 (6 pages).

International Preliminary Report on Patentability (PCT/IB/326 & PCT/IB/373) issued in PCT Application No. PCT/EP2022/065516 dated Dec. 28, 2023, including English translation of Written Opinion (PCT/ISA/237) (9 pages).

Japanese-language Office Action issued in Japanese Application No. 2023-577708 dated Nov. 5, 2024, with English translation (5 pages).

Chinese-language Office Action issued in Chinese Application No. 202280043211.6 dated Mar. 27, 2026 with English translation (12 pages).

* cited by examiner

METHOD AND DETECTION UNIT FOR DETECTING A PROBABILITY THAT A STEERING ELEMENT OF A VEHICLE IS HELD BY A HAND OF A DRIVER

BACKGROUND AND SUMMARY

The present disclosure relates to a method and a detection unit for detecting a probability of a steering element of a vehicle being held by a hand of a driver.

In modern vehicle safety systems or driver assistance systems, information is often required, especially in commercial vehicles, as to whether, or the fact that, the driver is actively holding his hands on the steering wheel and it can therefore be assumed that the driver is consciously controlling the driving of a vehicle. On the one hand, this is relevant if the driver is possibly distracted and therefore is not actively controlling the vehicle, with the result that, for reasons of traffic safety, an autonomous system should actively control the driving of this vehicle. On the other hand, active driving assistance, for example, should also be switched off or at least downgraded if the driver is clearly holding at least one of his hands on the steering wheel. Otherwise, the driver could be irritated or frightened by active autonomous steering interventions, thereby making driving errors that severely impair traffic safety in the environment of the vehicle.

Various concepts for driver hands-on detection (HOD), i.e. for detecting whether the driver is holding his hand on a steering element such as the steering wheel, have therefore been developed. In the conventional concepts, a HOD function can be realized, for example, by using a capacitive sensor on the steering wheel. However, apart from the advantages of this method, which makes it possible to precisely determine HOD, this is not a cost-effective solution for original equipment manufacturers, or "OEM" for short. The reason for this is the need for additional hardware, or "HW" for short.

The new steering systems for heavy-duty vehicles, such as the so-called "torque overlay steering system" or "TOS" for short, which are hybrid steering systems and, for example, have a servo motor to support the driver's steering input, benefit from a manual torque sensor. This includes, for example, a) an electrical actuation for producing a steering feel and providing additional functions for the driver, and b) a basic (e.g. hydraulic) transmission for transmitting a steering torque from the servo motor to the steering element or a steering column.

In this type of steering system, a driver assistance torque is controlled, for example, with the aid of mathematical and/or numerical algorithms. One of the safety-relevant algorithms is the practical recognition of the driver's hands placed on the steering element.

Against this background, it is the object of the present disclosure to provide an improved method and an improved detection unit for detecting a probability of a steering element of a vehicle being held by a hand of a driver.

This object is achieved by a method and a detection unit for detecting a probability of a steering element of a vehicle being held by a hand of a driver with the features or steps of the independent claims.

The approach presented here provides a method for detecting a probability of a steering element of a vehicle being held by a hand of a driver, wherein the method comprises the following steps:

reading in a torque signal representing a torque acting on a torque sensor coupled between the steering element and a steering transmission; and recognizing a probability of a steering element of a vehicle being held by a hand of a driver if a value of the torque signal and/or an absolute value of the torque signal exceed(s) a threshold value that is dependent on a current vehicle speed in order to detect the probability of the steering element of the vehicle being held by a hand of the driver.

A steering element can be understood as meaning, for example, a steering wheel or the like, also for example a joystick. A steering transmission can be understood as meaning, for example, a transmission in order to transmit a movement from the steering element to the wheels. For example, the steering transmission can also be used to introduce external forces or torques into the steering rod and thereby support active steering by the driver, for example by means of a servo motor. A torque sensor can be understood as meaning, for example, a sensor that captures a torque which is exerted by a driver of the vehicle on the steering element and is passed on to the steering transmission. In this case, however, the opposite direction is also particularly relevant, namely that it is possible to capture a torque which is directed from the steering transmission to the steering element and is changed by the driver when he holds his hands on the steering element. It is also contemplated for the torque sensor to detect a torque difference between a torque introduced by the driver to the steering element and a steering torque which is caused by the steering transmission and occurs on the steering rod when driving over ground obstacles. A value of the torque signal can be understood as meaning, for example, a torque that is currently captured at the torque sensor.

The approach presented here is based on the recognition that, by using the threshold value which depends on the current vehicle speed to assess the torque captured by the torque sensor, it is possible to identify very precisely whether a driver is actually holding his hands (or at least one hand) on the steering element or is holding the steering element. This results from the fact that, at higher speeds, a different torque can be introduced to the steering element by the vehicle's steering device than is introduced for a lower driving speed. In particular, use can be made here of the fact that, when driving through potholes or over stones on a road at low driving speeds for example, significantly larger deflections of the tires or wheels are expected to deflect laterally on the road than is the case for higher driving speeds. If such passive steering movements are now transmitted to the steering element by virtue of the vehicle driving over bumps on the roadway, a conclusion can be drawn from the evaluation of the torque captured by the torque sensor as to whether the driver is holding his hands on the steering element and thereby inhibits the passive steering movement on the steering element or whether the driver is not holding his hands on the steering element and thus the steering element can move freely according to the passive steering movement. In this case, if a threshold value is used to evaluate a value of the torque signal that depends on the vehicle's current driving speed, such a procedure can be used to make a good distinction as to whether the driver is currently holding his hands on the steering wheel or steering element.

An embodiment of the disclosure presented here, in which, in the recognizing step, use is made of a threshold value which has a lower value at a higher vehicle speed than at a lower vehicle speed, is advantageous. Such an embodiment of the approach proposed here offers the advantage that at higher vehicle speeds, even in the case of a lower threshold value, it can be very reliably decided whether the driver is holding his hands on the steering element or steering wheel of the vehicle. It may therefore be possible to more precisely recognize a driving situation by exploiting passive steering movements.

According to a further embodiment of the disclosure presented here, in the recognizing step, the probability of the steering element of the vehicle being held by a hand of the driver is further recognized using at least one time period for which a value of the torque signal and/or an absolute value of the torque signal exceed(s) the threshold value and/or is further recognized using at least a frequency with which the value of the torque signal and/or an absolute value of the torque signal exceed(s) the threshold value. In this case, use can be made of the fact that a time period for which a value of the torque signal and/or an absolute value of the torque signal exceed(s) the threshold value, and/or a frequency at which the value of the torque signal and/or an absolute value of the torque signal exceed(s) the threshold value, provide(s) an indication, for example, of how uneven a roadway on which the vehicle is driving is, for example if the wheels of the vehicle travel through a pothole while driving and transmit a passive steering movement caused by this to the steering element via the steering transmission. If the driver now holds the steering element with at least one hand, an increased, different torque, which for example exceeds the threshold value, can be captured thereby at the torque sensor for a short time than if the driver does not hold a hand on the steering element.

An embodiment of the disclosure presented here, in which, in the recognizing step, the probability of the steering element of the vehicle being held by a hand of the driver is further recognized using at least one time period threshold value which is exceeded by the time period, is also very advantageous. Alternatively or additionally, in the recognizing step, the probability of the steering element of the vehicle being held by a hand of the driver can be further recognized using at least one frequency threshold value which is exceeded by the frequency with which the value of the torque signal and/or an absolute value of the torque signal exceed(s) the threshold value. A time period threshold value can be understood as meaning, for example, a threshold value that can be exceeded by the time period which itself represents a period for which a value of the torque signal exceeds the threshold value. A frequency threshold value can be understood as meaning, for example, a threshold value that can be exceeded by the frequency which itself represents a frequency with which the value of the torque signal exceeds the threshold value. Such an embodiment offers the advantage of being able to achieve a further increase in precision when recognizing the probability of the steering element of the vehicle being held by a hand of the driver by using a time period threshold value and/or a frequency threshold value.

It is further contemplated that, according to an embodiment presented here, in the recognizing step, the probability of the steering element of the vehicle being held by a hand of the driver becomes smaller the longer a value of the torque signal and/or an absolute value of the torque signal exceed(s) a threshold value during an observation time. Such an embodiment of the approach proposed here offers the advantage of obtaining an indication of whether the steering element is held by a hand of the driver by evaluating the length of time for which the value of the torque signal exceeds the threshold value. In particular, use can be made here of the fact that a steering element held by the hand of the driver again enables active guidance of the vehicle after a short period by means of counter-steering movements, with the result that strong torques or steering angle deflections can be corrected or compensated for in the steering system.

According to a further embodiment proposed here, in the recognizing step, the probability of the steering element of the vehicle being held by a hand of the driver becomes greater the longer a value of the torque signal and/or an absolute value of the torque signal fall(s) below a threshold value again during the observation time. Such an embodiment offers the advantage of also being able to monitor that a value of the torque signal can also fall below the threshold value again, which then gives an indication that the steering element is (again) held by a hand of the driver.

According to a further embodiment, in the recognizing step, the probability of the steering element of the vehicle being held by a hand of the driver becomes smaller the longer a value of the time period exceeds the time period threshold value and/or a value of the frequency exceeds the frequency threshold value in an observation time interval. Such an embodiment offers the advantage of obtaining an indication of whether the steering element is held by a hand of the driver by evaluating the length of time for which or the frequency with which the value of the torque signal exceeds the threshold value with respect to the corresponding time period threshold value or frequency threshold value. In this case, use can also likewise be made of the fact that a steering element held by the hand of the driver again enables active guidance of the vehicle after a short period by means of counter-steering movements, with the result that strong torques or steering angle deflections or a high frequency of the value of the torque signal exceeding the threshold can be corrected or compensated for in the steering system.

An embodiment presented here, in which, in the recognizing step, the probability of the steering element of the vehicle being held by a hand of the driver becomes greater the longer a value of the time period falls below the time period threshold value again and/or a value of the frequency falls below the frequency threshold value again in the observation time interval, is also particularly favorable. Such an embodiment also offers the advantage of also being able to monitor that a value of the torque signal can also fall below the threshold value again, which then, with reference to a corresponding time period threshold value and/or frequency threshold value, gives a particularly good and clear indication that the steering element is held by a hand of the driver.

In order to avoid a complex calculation of the probabilities, in the recognizing step, the probability can be increased or reduced in probability levels, in particular in probability levels of 10 percent.

An embodiment presented here, in which, in the recognizing step, use is made of a threshold value which is dependent on a steering lock angle of the steering element, is furthermore also advantageous. Such an embodiment presented here offers the advantage that, even as a result of the steering angle lock, particularly good information about the position of the wheels of the vehicle when driving can be assumed. This position of the wheels in relation to the longitudinal axis of the vehicle then also influences the effect of driving over a bump, with the result that the passive steering movements, which are transmitted to the steering element, are thereby again represented differently than in the case of driving straight ahead. The consideration of such a position of the wheels can thus provide a further increase in the quality for recognizing whether the driver is holding the steering element with his hand.

In order to avoid interference influences as well as possible when evaluating the torque signal, in the reading-in step, the torque signal can be read in exclusively from a torque sensor which is installed and/or embedded in or on a steering column of the vehicle, in particular wherein the torque sensor transmits a rotation of the steering element to a steering transmission. This allows the passive steering movements to be captured very well and evaluated without interference from other sources.

This method can be implemented, for example, in software or hardware or in a combined software and hardware form, for example in a control unit.

The disclosure presented here further provides a detection unit as an apparatus which is designed to carry out, control or implement the steps of a variant of a method presented here in appropriate devices. This embodiment variant in the form of a detection unit also allows the underlying object of the approach to be achieved quickly and efficiently.

For this purpose, the detection unit can have at least one computing unit for processing signals or data, at least one memory unit for storing signals or data, at least one interface to a sensor or an actuator for reading in sensor signals from the sensor or for outputting data or control signals to the actuator and/or at least one communication interface for reading in or outputting data which are embedded in a communication protocol. The computing unit may be, for example, a signal processor, a microcontroller or the like, wherein the memory unit may be a flash memory, an EPROM or a magnetic memory unit. The communication interface may be designed to read in or output data wirelessly and/or in a wired manner, wherein a communication interface which can read in or output wired data can read in these data, for example electrically or optically, from a corresponding data transmission line or can output said data to a corresponding data transmission line.

In the present case, a detection unit can be understood as meaning an electrical device which processes sensor signals and outputs control and/or data signals on the basis thereof. The detection unit may have an interface which may be designed using hardware and/or software. In a hardware design, the interfaces can be, for example, part of a so-called system ASIC which contains a wide variety of functions of the apparatus. However, it is also possible for the interfaces to be separate, integrated circuits or at least partially consist of discrete components. In a software design, the interfaces may be software modules which are available, for example, on a microcontroller alongside other software modules.

Exemplary embodiments of the disclosure are explained in more detail in the following description with reference to the figures.

In the following description of expedient exemplary embodiments of the present disclosure, identical or similar reference signs are used for the elements of similar action that are illustrated in the various figures, wherein a repeated description of these elements will not be given.

DETAILED DESCRIPTION OF THE DRAWINGS

Figure 1:
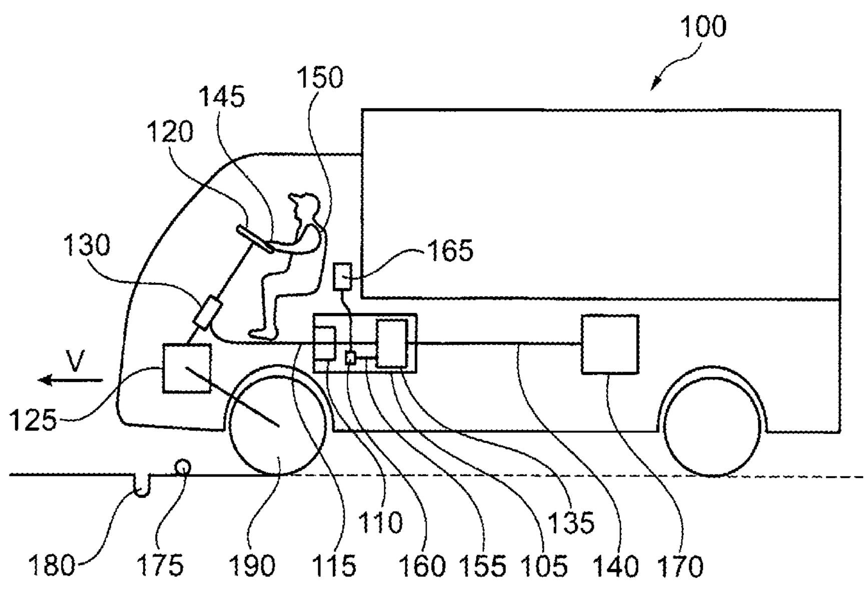
FIG. 1 is a schematic illustration of a vehicle comprising a detection unit according to an exemplary embodiment presented here.

FIG. 1 shows a schematic illustration of a vehicle 100 (which is in the form of a commercial vehicle or truck here) comprising a detection unit 105 in accordance with an exemplary embodiment presented here. The detection unit 105 has a read-in interface 110 via which a torque signal 115 can be read in, wherein this torque signal 115 represents a current torque acting on a torque sensor 130 coupled between a steering element 120 (here a steering wheel) of the vehicle 100 and a steering transmission 125. Furthermore, the detection unit 105 comprises a recognition unit 135 which provides, as an output signal, a probability 140 of the steering element 120 being held (firmly) by a hand 145 of a driver 150 of the vehicle 100. In order to recognize this probability 140, a value of the torque signal 115 and/or an absolute value of the torque signal 115 is/are compared with a threshold value 155 which can be read from a memory 160, for example. This threshold value 155 is further dependent on a current vehicle speed v of the vehicle 100, with the result that, for example, the memory 160 can also be coupled to a vehicle speed sensor 165, by means of which the current speed v of the vehicle 100 is determined and a correspondingly appropriate threshold value 155 is determined from the memory 160 and is transmitted to the recognition unit 135. The probability 140 can be determined or recognized on the basis of the fact that the value of the torque signal 115 and/or an absolute value of the torque signal 115 exceed(s) this threshold value 155, as is described in yet more detail below.

In the present case, the probability 140 indicates a probability of the driver 150 holding the steering element 120 with his hand 145. The probability may also indicate a validity of a signal that relates to information as to whether the driver 150 is holding the steering element 120 with his hand 145. Such information is necessary or helpful, for example, when an autonomous vehicle system or a driver assistance system 170 is provided in the vehicle 100 and assists the driver 150 with the control of the vehicle 100 (or even itself autonomously controls the vehicle 100). In this case, for legal reasons and/or comfort reasons, it is clearly recognizable that the driver 150 is actively holding the steering element 120 with his hand 145 and it can therefore be assumed that he has actively taken over the control of the vehicle 100. In this case, steering interventions from the driver assistance system 170 should be stopped or downgraded in priority (except in the rare case of emergency intervention in the vehicle control unit) in order to avoid hindering the driver 150 in the active vehicle guidance function.

In order to now use the approach presented here to recognize the probability of the steering element 120 of the vehicle 100 being held (firmly) by the hand 145 of the driver 150, a passive steering effect can be used if, for example, the vehicle 100 drives over an uneven surface, for example a road on which stones 175 are located or in which potholes 180 occur. If a wheel 190 of the vehicle 100 now drives over such a stone 175 or into such a pothole 180, this will lead to a lateral deflection of the wheel 190 that is transmitted to the steering element 120 via the steering transmission 125. If the driver 150 now holds the steering element 120 with his hand 140, this will lead to a different torque effect, which can be captured at the torque sensor 130, than if the driver 150 does not hold the steering element 120 with his hand 145. Specifically, in such a case in which the driver 150 holds the steering element 120, no such large torques can be captured at the torque sensor 130 as when the driver 150 does not hold the steering element 120. It must be taken into account that the lateral deflection of the wheel 190 is specifically dependent on a speed v of the vehicle 100, and so, for precise recognition of the probability 140, this speed v should also be taken into account for the selection of the appropriate threshold value 155. In addition, a steering angle representing a rotation angle of the steering element 120, or indirectly also a rotation angle by which the wheel 190 of the vehicle 100 is turned in relation to the direction of travel of the vehicle 100, may also be relevant, since in this case driving over the stone 175 or driving through the pothole 180 causes a different movement in the steering transmission 125 than when the wheel 190 is set straight ahead in the direction of travel of the vehicle 100. In this respect, for the approach presented here, use can be made of the fact that the steering element 120 moves by itself in a certain way through the effect of the surface driven over by the vehicle 100 during driving of the vehicle 100, and a change in this (induced) movement can be evaluated as an indication of the probability of the driver 150 of the vehicle 100 holding the steering element 120 with his hand 145.

For autonomous driving, the determination of two driving states, that is to say on the one hand the driver controls the vehicle steering wheel and on the other hand the driver does not control the steering wheel ("hands-on" recognition or "hands-on" detection, HOD), is an important safety function. This function, referred to as "hands-on detection", or "HOD" for short, is based on the analysis of the manual torque signal measured by the integrated torque sensor in the steering system. The approach presented here is used to present a method for improving the reliability of "hands-on detection". This method takes into account different driving conditions, namely freeway, highway and urban road. Among these, "hands-on" detection on the freeway at high speed is usually a challenge, since the driver's manual torque is too low to control the vehicle in a straight line.

Figure 2:
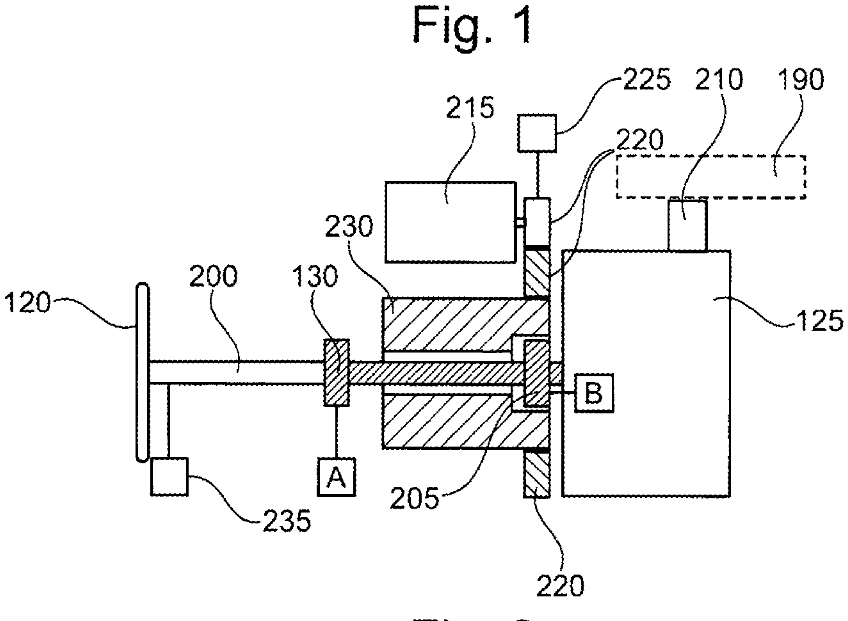
FIG. 2 is a schematic illustration of a part of the steering system in detail, according to an exemplary embodiment.

FIG. 2 shows a schematic illustration of a part of the steering system in detail, as roughly sketched in FIG. 1. First of all, as already previously mentioned, when developing the autonomous driving functions for a safe transition of the steering system from the driver to autonomous driving and vice versa, it is necessary to determine whether drivers' hands are on the steering wheel. On the one hand, this function is intended to perform HOD with a high degree of reliability and, on the other hand, is intended to be made possible on the basis of the available sensors on a standard TOS, in order to keep a product cost-efficient on the basis of the approach presented here.

The approach presented here can be used particularly favorably with a TOS system, i.e. a torque overlay system, which is schematically illustrated in FIG. 2. In this case, a torsion measuring rod is provided as the torque sensor 130 and is connected between a shaft 200 of the steering element 120, here the steering wheel, and a coupling-in element 205 and and is designed to capture a torque which occurs between the steering wheel as a steering element 120 and the steering transmission 125. An output shaft 210 is then used to achieve, for example, mechanical coupling between the steering transmission 125 and the wheels 190 illustrated in FIG. 1. In order to now assist a driver of the vehicle with the steering or in order to possibly steer the vehicle autonomously, a motor 215 or a servo motor is also provided and is coupled to the steering transmission 125 or the torque sensor 130 via a gear transmission 220, for example. A rotation of the motor, which can be captured using a rotational speed sensor 225, then makes it possible to change an effective steering torque in the torque sensor or generally in the steering train, for example also by means of a transmission unit 230 or a valve, with which the torque generated by the motor 215 is transmitted to the steering transmission 125 or the steering element 120. In this way, a motor-generated steering torque can furthermore also be overlaid on the torque impressed on the steering train by the steering element 120, which is implemented by the "torque overlay system" TOS.

The available sensors in a TOS are the encoder for determining the motor position of the shaft of the motor 215, which is formed in FIG. 2 by the rotational speed sensor 225, and the manual torque sensor as a torque sensor 130 which is illustrated in FIG. 2 acting between points A and B. The differential angle due to the T-bar/torsion bar deflection during operation of the steering wheel by the driver is measured between points A and B. In addition, a steering angle sensor 235 can be used to determine a steering wheel angle signal which represents the rotation of the steering element 120 and is provided, for example, by a sensor of the EBS system and can also be used for purposes of EBS control.

Figure 3:
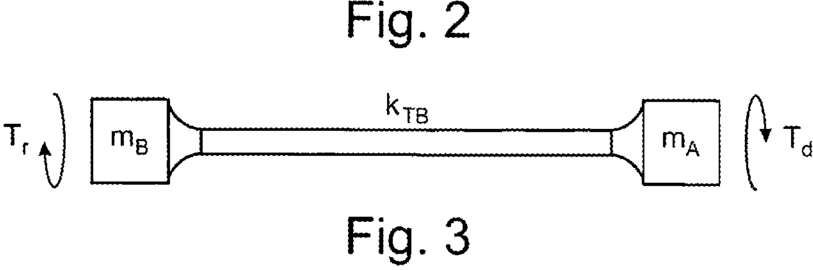
FIG. 3 is a schematic illustration for explaining the principle of torque measurement by means of the torque sensor used here.

FIG. 3 shows a schematic illustration for explaining the principle of torque measurement by means of the torque sensor used here. Due to the construction limitations of the steering system and the conceptual design, the manual torque sensor or the torque sensor 120 used here is normally installed at the top of the steering system. This sensor 120 is used to measure the differential angle between the input shaft (for example at point A from FIG. 2) and the valve/transmission unit 230 (for example at point B from FIG. 2) in order to calculate the (manual) torque of the driver. The torsion bar or the torque sensor 120 is connected to the motor 215 at point B via the gear transmission 220. Due to the backlash in the transmission or here the gear transmission 220, there is usually a discrepancy between the measured angle θ of these two points. Thus, a difference between a (road) torque $T_r$ coupled into the steering system by the passive steering by the steering transmission 125 and a manual torque $T_d$ of the driver resulting from the steering element 120 being held by the hand of the driver is measured. The following equations apply to this when taking into account the rotation angle θ of the shaft of the steering element 120:

$$\theta_C = \theta_B \pm \varepsilon$$

$$T_d = k_{TB}(\theta_A - \theta_B) = k_{TB}(\theta_A - \theta_C \pm \varepsilon)$$

$$T_{err} = k_{TB}\varepsilon$$

where $T_d$ represents a torque exerted by a hand of the driver, $k_{TB}$ represents the elasticity of the torsion bar as a torque sensor, Tr represents a torque coupled in via the steering transmission and resulting from driving on an uneven roadway, and $T_{err}$ represents the inaccuracy in the driver's hand torque measurement, which should be kept as small as possible in the TOS.

Figure 4:
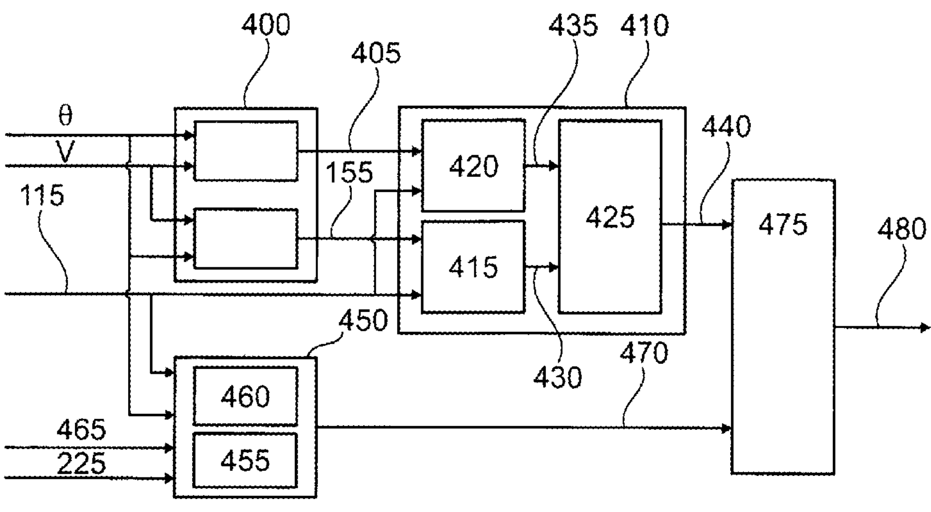
FIG. 4 is an exemplary embodiment of a flowchart of a method for detecting a probability of a steering element of a vehicle being held by a hand of a driver.

FIG. 4 shows an exemplary embodiment of a flowchart of a method for detecting a probability of a steering element of a vehicle being held by a hand of a driver as an example of a concept of a hands-off recognition algorithm. In this respect, FIG. 4 illustrates a diagram of the procedure according to this exemplary embodiment in the form of an HOD block diagram. First of all, for example in a precondition block 400, the (torque) threshold value 155 and a frequency threshold value 405 are calculated on the basis of the vehicle speed v and the steering wheel angle θ, which are described in yet more detail in the following FIGS. 5 and 6. In a calculation block 410, the range of the torsion bar torque, in which the torque is currently located, is determined in a torque calculation unit 415. The range of the amplitude of the (torsion bar) torque signal 115 is determined according to the torque threshold value 155, and an output flag is set accordingly to 1 for the duration for which the (torsion bar) torque signal 115 or an absolute value of the (torsion bar) torque signal 115 exceeds the (torque) threshold value 155.

During the frequency range test, the time period in which the torsion bar torque signal 115 is outside the range or the (torque) threshold value 155, or exceeds the (torque) threshold value 155 in real or absolute terms, is calculated in the calculation block 410 in a frequency calculation unit 420 and is compared with a frequency threshold value 405. A flag is set to 1 if the calculated time period is less than the frequency threshold value 405, as illustrated in the following FIG. 7.

In the "out of range" compensation block 425, an output flag 430 of the amplitude range test is manipulated according to the output flag 435 of the frequency range test. The zero torque flag is set to 1 for the intervals in which the frequency flag is 1 and is provided as the HOD flag 440.

In a signal conditioning block 450, a redundancy-based plausibility check is carried out for the input signals in a plausibility block 455. For this reason, the discrepancy between the torsion bar angle and the steering wheel angle θ should be less than a threshold value. In addition, a torque signal can be calculated from the motor angle of the motor 215, the steering wheel angle θ and the torsion bar rate in a rotation rate calculation unit 460. In addition, an angle 465 of the steering wheel can also be incorporated further into the calculation. The discrepancy between this calculated torque signal and the torsion bar torque should also be less than a threshold value. Based on the plausibility check of the signals, a degradation strategy is applied for the HOD confidence determination.

A confidence level 470 of the HOD algorithm can be based on a time counter and a comparison of the values calculated here. In a final detection of a probability of a steering element of a vehicle being held by a hand of a driver, a corresponding probability signal 480 is determined in a probability determination unit 475 and is then forwarded, for example, to the driver assistance system 170 illustrated in FIG. 1.

The determination or processing of the variables used in this approach is now explained in more detail below.

Figure 5:
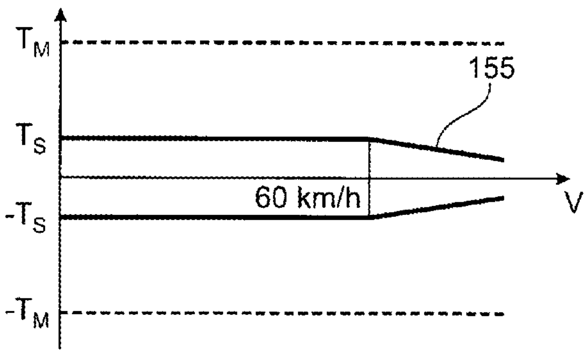
FIG. 5 is a diagram for explaining a dependence of the (torque) threshold value on a vehicle speed.

FIG. 5 shows a diagram for explaining a dependence of the (torque) threshold value 155 on a vehicle speed. In this diagram from FIG. 5, the vehicle speed v is plotted on the x-axis and a torque T is plotted on the y-axis. In order to determine whether or not the vehicle is being steered by the driver, i.e. whether the "hand off" or "hand on" case is present, it should be recognized whether the driver applies a torque to the steering element 120 in FIG. 1 or inhibits a torque introduced to the steering element 120 via passive steering. In an open-loop torque overlay system, the driver's steering effort depends on the torque acting on the steering wheel pivot arm. This effort changes in proportion to the vehicle speed. At lower speeds v, the driver's steering effort is greater than at higher speeds. The minimum torque of the driver for overcoming resistance forces in order to start the steering at any vehicle speed is considered in this methodology to be the (torque) threshold $T_S$ relative to the maximum possible measurable torque $T_M$. According to the above explanation, the threshold value 155 for the torque amplitude is reduced by increasing the vehicle speed v. The determination of this threshold 155 is the subject of function tuning and parameter optimization.

Figure 6:
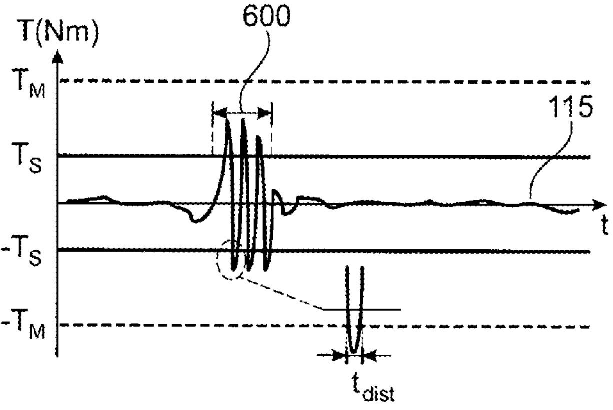
FIG. 6 is a diagram for explaining determination of the frequency threshold value.

FIG. 6 shows a diagram for explaining determination of the frequency threshold value. In this diagram from FIG. 6, the time t is plotted on the x-axis and a torque T is plotted on the y-axis. The distinction between the frequency of the driver's (manual) torque T and the influence of roadway disturbances on the measured torque signal 115 is the subject of the frequency threshold value determination. Various road disturbances such as driving through or over stones 175 or potholes 180 cause high-frequency disturbances in the (manual) torque signal 115. The frequency f or the corresponding time period $t_{dist}$ of the disturbances is proportional to the vehicle speed v, while their amplitude T depends on the depth of the pothole if the vehicle drives through the pothole in the period 600. Increasing the vehicle speed v increases the frequency f of the oscillation in the signal 115. The determination of this threshold 405 is the subject of function tuning and parameter optimization.

Figure 7:
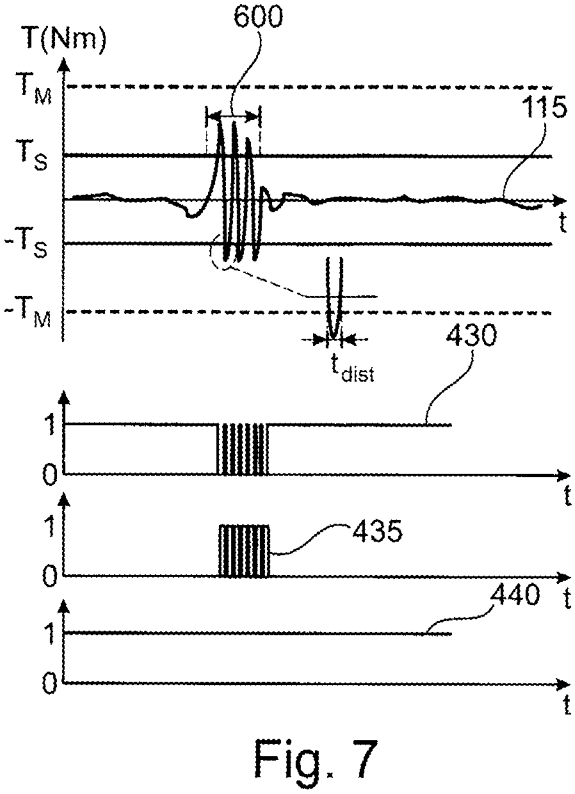
FIG. 7 shows a plurality of diagrams for explaining a calculation of the HOD flag, as is performed, for example, in the calculation block.

FIG. 7 shows a plurality of diagrams for explaining a calculation of the HOD flag, as is performed, for example, in the calculation block 410. In the upper one of these diagrams from FIG. 7, the time t is plotted on the x-axis and a torque T is plotted on the y-axis. For the description of the procedure, recourse is had here to the scenario which has already been described in more detail with reference to FIG. 6. In the lower diagrams from FIG. 7, the time is plotted on the x-axis and a value of a flag is plotted on the y-axis.

The amplitude of the torque signal 115 is observed during the amplitude range test in the unit 415. If the torque signal 115 is, for example, within the threshold values 405 and 115 predefined by the precondition block 400, this block 415 sets its output flag 430 to the binary value 1, and otherwise to 0, as is illustrated in the sub-diagram for the output flag 430.

During the frequency range test in the corresponding block 420, the frequency of the torque signal 115 is observed. If the time period $t_{dist}$ in which the torque signal 115 is outside the amplitude threshold value 155 is less than the threshold value 405 given by the precondition block 40, this block 420 sets its output flag 435 to the binary value of 1, and otherwise 0, as is illustrated in the sub-diagram for the output flag 435.

Based on the flag of the frequency range test in block 420, the flag of the amplitude range test 415 is corrected in the module 425 for compensating for the range being exceeded. In the areas in which the torque flag is 0, but the frequency flag is 1, the torque flag is set to 1, as illustrated in the sub-diagram for the HOD flag 440.

Figure 8:
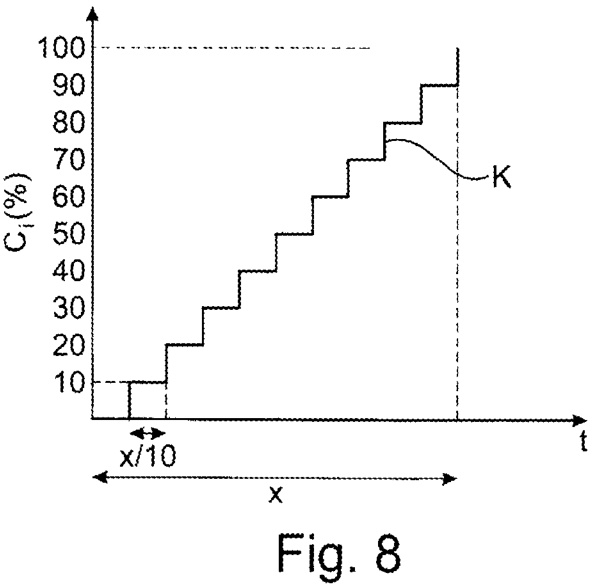
FIG. 8 is a diagram for explaining the concept of determining a probability of a steering element of a vehicle being held by a hand of a driver.

FIG. 8 shows a diagram for explaining the concept of determining a probability of a steering element of a vehicle being held by a hand of a driver. In this case, a time t is plotted on the x-axis and a confidence level C in percent is plotted on the y-axis. In this case, the confidence level C can rise or fall in steps of 10 percent in order to simplify a calculation of this confidence level.

Figure 9:
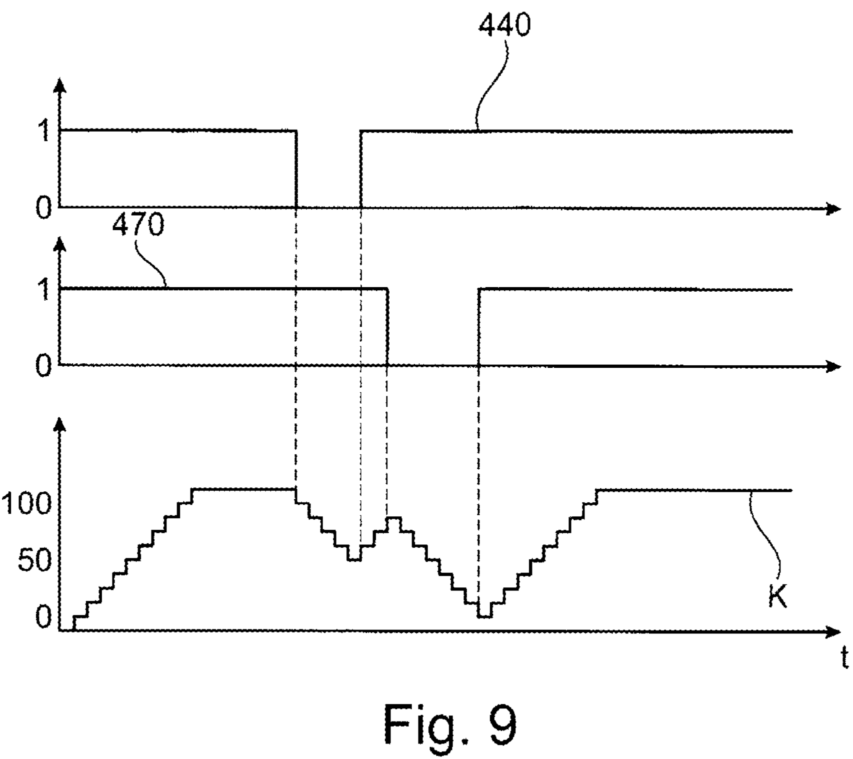
FIG. 9 are diagrams for explaining the concept of determining a probability of a steering element of a vehicle being held by a hand of a driver.

FIG. 9 shows diagrams for explaining the concept of determining a probability of a steering element of a vehicle being held by a hand of a driver. In this case, a time t is plotted on the x-axis and a value of the respectively relevant flag is plotted on the y-axis in the two upper sub-diagrams and a confidence level C in percent is plotted on the y-axis in the lower sub-diagram. A time-dependent strategy is used to determine the HOD confidence level K, 140. The value 0 of the HOD flag 440 indicates the hands-on mode, while the flag value 1 indicates the hands-off mode. If the HOD signal 440 changes from 0 to 1, the confidence signal or a probability K, 140 begins to rise from 0 to 100 percent in a time interval of 10 percent in each case, as illustrated in FIG. 9. The time interval is a tuning parameter with a minimum limit that depends on the system properties and the sensor quality.

If the HOD flag 440 changes from 1 to 0 or if the signal confidence level 470 calculated in the signal conditioning block 450 changes from 1 to 0, the confidence level or the probability K, 140 of the HOD is reduced, as illustrated in FIG. 9.

Figure 10:
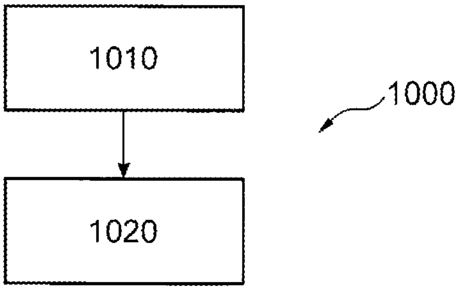
FIG. 10 is a flowchart of an exemplary embodiment of a method for detecting a probability of a steering element of a vehicle being held by a hand of a driver.

FIG. 10 shows a flowchart of an exemplary embodiment of a method 1000 for detecting a probability of a steering element of a vehicle being held by a hand of a driver. The method 1000 comprises a step 1010 of reading in a torque signal representing a torque acting on a torque sensor coupled between the steering element and a steering transmission. Finally, the method 1000 comprises a step 1020 of recognizing a probability of a steering element of a vehicle being held by a hand of a driver if a value of the torque signal and/or an absolute value of the torque signal exceed(s) a threshold value that is dependent on a current vehicle speed in order to detect the probability of the steering element of the vehicle being held by a hand of the driver.

The approach presented here makes it possible to achieve several advantages, such as precise recognition of whether a hand of the driver is holding the steering wheel or recognition of whether both hands are being held on the steering wheel. Such recognition can also be performed in different driving conditions (city/highway/freeway/gravel road . . . ) or recognition can be performed within a time window, with no or only very few recognition errors occurring. It is also possible to compensate for potholes and to take into account a frequency and amplitude of impact incidents, i.e. incidents when driving through or over a pothole or a stone. It is also conceivable that the approach presented here can be used to compensate for external influences (e.g. crosswind/road inclination . . . ) or that an immediate hands-on recognition is possible. It is also possible to perform speed-independent recognition which enables particularly precise recognition of the probability. It is also possible to achieve simple applicability by means of a special optimization tool and a high robustness of the HOD.

The approach presented here makes it possible to recognize driving states, for example, based on the vehicle speed/torque and steering angle. Depending on the driving state, for example, appropriate filters which are used to prepare the required signals are selected. The signals are processed and combined using a special algorithm (for example, freezing of the signal position in certain situations/statistical evaluations/comparison with known or learned situations/consideration of time intervals). This can be used to determine, as a result result, a probability of the driver having his hands on the steering wheel. As a second result, an actual evaluation (for example also in digital form) can also be implemented very easily. Parameters used for this are dependent on the vehicle type, which means that an optimization can be easily carried out for each type. For such a case, there is a program that uses special measured values to determine the parameters for optimal recognition. This makes it easy to achieve a reliable/repeatable result. The function presented here can also be easily equipped with an HMI (human machine interface) and such a model can be parameterized and easily switched on/off. Situations which are difficult to recognize (for example in the case of a high speed or level ground/roadway) can be identified by changing the steering assistance. This reduces the need for steering assistance, resulting in a greater manual torque, which is itself consequently better recognizable. (Torque) test pulses can also be output to the steering system (e.g. by means of the motor) and a reaction of torque/steering speed thereto can be captured. A model of the steering transmission-steering wheel distance can then be determined simply, robustly and reliably, with the aim of extracting the driver's share/subtracting vehicle reactions (vibrations . . . ).

In particular, the approach presented here can be used to demonstrate a method for determining whether the driver is holding his hand on the steering wheel of the vehicle with a high degree of certainty. This makes it possible to increase the robustness of hands-on recognition, in which case such a determination can be based only on values from a torque sensor on the input shaft of the steering system. It is also possible to precisely determine the driver's hands on the freeway at high speed and when driving straight ahead, as well as to precisely determine the driver's hands on the steering element by taking into account the mechanical play in the system. Furthermore, it is also possible to precisely determine the driver's hands on the steering element by checking the plausibility of the manual torque signal and to precisely determine the driver's hands on the steering element by developing a specific tool for function tuning. It is also conceivable to precisely determine the driver's hands on the steering element by way of a dependence of the function on the vehicle speed and by rejecting the external disturbances in the output of the function.

The method steps presented here can be repeated and executed in a different order than the one described.

If an exemplary embodiment comprises an "and/or" combination between a first feature and a second feature, this is to be read as meaning that the exemplary embodiment, according to one embodiment, has both the first feature and the second feature and, according to a further embodiment, has either only the first feature or only the second feature.

LIST OF REFERENCE SIGNS

100 Vehicle
105 Detection unit
110 Read-in interface
115 Torque signal

120 Steering element
125 Steering transmission
130 Torque sensor
135 Recognition unit
140 Probability
145 Hand
150 Driver
155 Threshold value
160 Memory
165 Vehicle speed sensor
170 Driver assistance system
175 Stone
180 Pothole
190 Wheel
v Vehicle speed
200 Shaft
205 Coupling-in element
210 Output shaft
215 Motor
220 Gear transmission
225 Rotational speed sensor
230 Transmission unit
235 Steering angle sensor
$T_r$ (Road) torque
$T_d$ (Manual) torque
θ Rotation angle, steering wheel angle
400 Precondition block
405 Frequency threshold value
410 Calculation block
415 Torque calculation unit
420 Frequency calculation unit
425 Compensation block
430 Output flag
435 Output flag
440 HOD flag
450 Signal conditioning block
455 Plausibility block
460 Rotation rate calculation unit
465 Angle of the steering wheel
470 Confidence level
475 Probability determination unit
480 Probability signal
T Torque
$T_S$ (Torque) threshold value
$T_M$ Maximum possible measurable torque
$t_{dist}$ Time period
600 Period
C Confidence level
K HOD confidence level. Probability
1000 Method for detecting a probability of a steering element of a vehicle being held by a hand of a driver
1010 Step of reading in a torque signal
1020 Step of recognizing a probability of a steering element of a vehicle being held by a hand of a driver

The invention claimed is:

1. A method for detecting a probability of a steering element of a vehicle being held by a hand of a driver, the method comprising the steps of:

reading-in a torque signal, with a processor of the vehicle, representing a torque acting on a torque sensor coupled between the steering element and a steering transmission;

determining, with the processor, at least one of a value of the torque signal or an absolute value of the torque signal exceed(s) a threshold value that is dependent on a current vehicle speed, where the threshold value has a lower value at a higher vehicle speed than a lower vehicle speed;

determining, with the processor, a probability of the steering element of the vehicle being held by a hand of the driver when at least one of the value of the torque signal or the absolute value of the torque signal is determined to exceed(s) the threshold value; and at least one of omitting or downgrading in priority, with the processor, a steering intervention by a driver assistance system of the vehicle when the probability of the steering element of the vehicle being held by a hand of the user indicates a valid signal that the driver is holding the steering wheel with their hand.

2. The method as claimed in claim 1, wherein, in determining the probability, the probability of the steering element of the vehicle being held by a hand of the driver is further recognized by at least one of:

(i) using at least one of at least one time period for which a value of the torque signal or an absolute value of the torque signal exceed(s) the threshold value, or (ii) using at least one of at least a frequency with which the value of the torque signal or an absolute value of the torque signal exceed(s) the threshold value.

3. The method as claimed in claim 2, wherein, in determining the probability, the probability of the steering element of the vehicle being held by a hand of the driver is further recognized by at least one of:

(i) using at least one of at least one time period threshold value, which is exceeded by the time period for which a value of the torque signal or an absolute value of the torque signal exceed(s) the threshold value, or (ii) using at least one of at least one frequency threshold value which is exceeded by the frequency with which the value of the torque signal or an absolute value of the torque signal exceed(s) the threshold value.

4. The method as claimed in claim 1, wherein, in determining the probability, the probability of the steering element of the vehicle being held by a hand of the driver becomes smaller when a value of at least one of the torque signal or an absolute value of the torque signal exceed(s) a threshold value during an observation time.

5. The method as claimed in claim 4, wherein, in determining the probability, the probability of the steering element of the vehicle being held by a hand of the driver becomes greater when a value of at least one of the torque signal or an absolute value of the torque signal fall(s) below a threshold value again during the observation time.

6. The method as claimed in claim 3, wherein, in determining the probability, the probability of the steering element of the vehicle being held by a hand of the driver becomes smaller the longer at least one of a value of the time period exceeds the time period threshold value or a value of the frequency exceeds the frequency threshold value in an observation time interval.

7. The method as claimed in claim 6, wherein, in determining the probability, the probability of the steering element of the vehicle being held by a hand of the driver becomes greater when at least one of a value of the time period falls below the time period threshold value again or a value of the frequency falls below the frequency threshold value again in the observation time interval.

8. The method as claimed in claim 4, wherein, in determining the probability, the probability is increased or reduced in probability levels.

9. The method as claimed in claim 8, wherein, in determining the probability, the probability is increased or reduced in probability levels of 10 percent.

10. The method as claimed in claim 6, wherein, in determining the probability, the probability is increased or reduced in probability levels.

11. The method as claimed in claim 10, wherein, in determining the probability, the probability is increased or reduced in probability levels of 10 percent.

12. The method as claimed in claim 1, wherein, in determining the probability, use is made of a threshold value which is dependent on a steering lock angle of the steering element.

13. The method as claimed in claim 1, wherein, in determining the probability, the torque signal is read-in exclusively from a torque sensor which is at least one of installed or embedded in or on a steering column of the vehicle, wherein the torque sensor transmits a rotation of the steering element to a steering transmission.

14. A detection unit, comprising:

a processor configured to carry out the acts of:

reading-in a torque signal representing a torque acting on a torque sensor coupled between the steering element and a steering transmission;

determine at least one of a value of the torque signal or an absolute value of the torque signal exceed(s) a threshold value that is dependent on a current vehicle speed, where the threshold value has a lower value at a higher vehicle speed than a lower vehicle speed;

determine a probability of the steering element of the vehicle being held by a hand of the driver when at least one of value of the torque signal or the absolute value of the torque signal is determined to exceed(s) the threshold value; and at least one of omit or downgrade in priority a steering intervention by a driver assistance system of the vehicle when the probability of the steering element of the vehicle being held by a hand of the user indicates a valid signal that the driver is holding the steering wheel with their hand.

15. A computer product comprising a non-transitory computer-readable storage medium having stored thereon program code which, when executed on one more processors, carries out the acts of:

reading-in a torque signal representing a torque acting on a torque sensor coupled between the steering element and a steering transmission;

determining at least one of a value of the torque signal or an absolute value of the torque signal exceed(s) a threshold value that is dependent on a current vehicle speed, where the threshold value has a lower value at a higher vehicle speed than a lower vehicle speed; and determining a probability of the steering element of the vehicle being held by a hand of the driver when at least one of the value of the torque signal or the absolute value of the torque signal is determined to exceed(s) the threshold value; and at least one of omitting or downgrading in priority a steering intervention by a driver assistance system of the vehicle when the probability of the steering element of the vehicle being held by a hand of the user indicates a valid signal that the driver is holding the steering wheel with their hand.

* * * * *